United States Patent
Kim et al.

(10) Patent No.: US 8,194,606 B2
(45) Date of Patent: Jun. 5, 2012

(54) METHOD FOR SCANNING ACCESS POINTS DURING STATION'S HANDOFF PROCEDURE IN WIRELESS COMMUNICATION SYSTEM AND STATION PERFORMING THE METHOD, AND NETWORK INTERFACE SUPPORTING THE METHOD AND WIRELESS COMMUNICATION SYSTEM ENABLING THE METHOD

(75) Inventors: Youngsoo Kim, Yongin-si (KR); Sunghyun Choi, Seoul (KR); Kyung Hun Jang, Yongin-si (KR); Sunggeun Jin, Seoul (KR); Hyo Sun Hwang, Yongin-si (KR); Munhwan Choi, Seoul (KR)

(73) Assignees: Samsung Electronics Co., Ltd., Suwon-si (KR); Seoul National University Industry Foundation, Seoul (KR)

( * ) Notice: Subject to any disclaimer, the term of this patent is extended or adjusted under 35 U.S.C. 154(b) by 933 days.

(21) Appl. No.: 11/706,953

(22) Filed: Feb. 16, 2007

(65) Prior Publication Data

US 2008/0056211 A1    Mar. 6, 2008

(30) Foreign Application Priority Data

Sep. 1, 2006 (KR) .................. 10-2006-0084417

(51) Int. Cl.
*H04W 4/00* (2009.01)
(52) U.S. Cl. ..... 370/331; 370/332; 370/338; 455/432.1; 455/436
(58) Field of Classification Search .................. 370/319, 370/331, 332, 312, 313, 349, 431–433, 346–348, 370/446–448; 455/436, 455, 509, 513
See application file for complete search history.

(56) References Cited

U.S. PATENT DOCUMENTS

| | | | | |
|---|---|---|---|---|
| 6,091,732 A * | 7/2000 | Alexander et al. | ............ | 370/401 |
| 6,580,700 B1 * | 6/2003 | Pinard et al. | .................. | 370/332 |
| 7,065,376 B2 * | 6/2006 | Wolman et al. | ............... | 455/517 |
| 7,400,604 B2 * | 7/2008 | Lee et al. | ........................ | 370/332 |
| 7,545,776 B2 * | 6/2009 | Coupechoux et al. | ........ | 370/331 |
| 7,616,604 B2 * | 11/2009 | Abdelhamid et al. | ........ | 370/329 |
| 7,653,386 B2 * | 1/2010 | Bennett | ...................... | 455/422.1 |
| 7,660,278 B2 * | 2/2010 | Qi et al. | ......................... | 370/328 |
| 7,805,140 B2 * | 9/2010 | Friday et al. | .................. | 455/436 |
| 7,907,582 B2 * | 3/2011 | Du et al. | ........................ | 370/338 |
| 2004/0043767 A1* | 3/2004 | Tsutsumi et al. | ........... | 455/432.1 |
| 2004/0190514 A1* | 9/2004 | Uchiyama et al. | ............ | 370/390 |
| 2004/0224690 A1* | 11/2004 | Choi et al. | ..................... | 455/436 |

(Continued)

OTHER PUBLICATIONS

"Techniques to reduce the IEEE 802.11b handoff time" Héctor Velayos et al., IEEE Communications Society, 2004.

(Continued)

*Primary Examiner* — Kent Chang
*Assistant Examiner* — Magdi Elhag
(74) *Attorney, Agent, or Firm* — NSIP Law

(57) ABSTRACT

A wireless communication system includes at least one AP assigned with a unique MAC address and a shared virtual MAC address; and at least one mobile station to search the at least one AP, receive AP information from the retrieved AP, and perform a handoff, wherein the mobile station transmits query data to the shared virtual MAC address, receives response data from the AP, determines whether the AP exists on a predetermined channel, and when the AP exists on the channel, requests the AP having the shared virtual MAC address for AP information, and receives the AP information from the AP.

18 Claims, 8 Drawing Sheets

U.S. PATENT DOCUMENTS

| | | |
|---|---|---|
| 2005/0143073 A1* | 6/2005 | Lee et al. ............... 455/436 |
| 2005/0198337 A1* | 9/2005 | Sun et al. ............... 709/230 |
| 2006/0092888 A1 | 5/2006 | Jeong et al. |
| 2006/0111103 A1 | 5/2006 | Jeong et al. |
| 2006/0215622 A1* | 9/2006 | Abdel-Kader et al. ....... 370/338 |
| 2007/0025293 A1* | 2/2007 | Choi ............... 370/331 |
| 2007/0053287 A1* | 3/2007 | Li et al. ............ 370/229 |
| 2007/0091839 A1* | 4/2007 | Abdelhamid et al. ....... 370/329 |
| 2007/0105575 A1* | 5/2007 | Sampath et al. ........... 455/509 |
| 2007/0105576 A1* | 5/2007 | Gupta et al. ............... 455/509 |
| 2007/0201490 A1* | 8/2007 | Mahamuni ............. 370/395.54 |
| 2007/0232307 A1* | 10/2007 | Ibrahim et al. ............... 455/436 |
| 2007/0270171 A1* | 11/2007 | Wentink ............... 455/515 |

OTHER PUBLICATIONS

Search Report and Written Opinion mailed on Jun. 18, 2007, in International Patent Application No. PCT/KR2007/001025.

* cited by examiner

METHOD FOR SCANNING ACCESS POINTS DURING STATION'S HANDOFF PROCEDURE IN WIRELESS COMMUNICATION SYSTEM AND STATION PERFORMING THE METHOD, AND NETWORK INTERFACE SUPPORTING THE METHOD AND WIRELESS COMMUNICATION SYSTEM ENABLING THE METHOD

CROSS-REFERENCE TO RELATED APPLICATIONS

This application claims the benefit of Korean Patent Application No. 2006-84417, filed on Sep. 1, 2006 in the Korean Intellectual Property Office, the disclosure of which is incorporated herein by reference.

BACKGROUND OF THE INVENTION

1. Field of the Invention

Aspects of the present invention relate to a method of scanning an access point (AP) during a handoff procedure of a base station in a wireless communication system, a network interface to support the method, and a wireless communication system to enable the method. More particularly, aspects of the present invention relate to a method of quickly scanning an AP during a handoff procedure in a wireless communication system, a network interface to support the method, and a wireless communication system to enable the method in which the wireless communication system includes at least one AP and at least one mobile station.

2. Description of the Related Art

As Institute of Electrical and Electronics Engineers (IEEE) 802.11 wireless local area networks (WLANs) are widely deployed and emergence of new services accelerates, support for real-time interactive applications, such as Voice over WLAN (VoWLAN), becomes increasingly necessary. Since mobility of user terminals is an important issue in an All-Internet Protocol (IP) environment, there is an increased need to provide seamless services to a mobile station moving in a wireless communication system. Thus, technology to enhance quality of a wireless communication service by reducing latencies and failures occurring during a handoff becomes indispensable.

The handoff according to IEEE 802.11 WLANs consists of three components, scanning, authentication, and re-association. (1) Scanning is a process to discover access points (APs) suitable for handoff and acquire AP information of the discovered APs; (2) authentication is a process to identify an individual mobile station authorized for association; and (3) association is a process to establish a mapping between an AP and a mobile station. Re-association occurs instead of association when the mobile station is already associated with another AP.

According to studies, scanning is the most time-consuming among the three components of the handoff, accounting for more than 90% of the overall handoff latency. The reason why scanning latency is high is because scanning was originally designed for the initialization of a mobile station. When a mobile station is initially switched on, the mobile station does not have any information about neighboring APs to associate with. The mobile station scans for neighboring APs to collect information about the neighboring APs.

Scanning methods may be classified into an active scanning method and a passive scanning method. In the active scanning method, a mobile station broadcasts a Probe Request frame on a predetermined channel and waits until an AP of the channel transmits a Probe Response corresponding to the Probe Request frame. If the mobile station does not receive the Probe Response during a MinChannelTime or a MaxChannelTime, the mobile station repeats the process using another channel.

In the passive scanning method, a mobile station listens for a beacon transmitted from an AP at predetermined time intervals and finds neighboring APs via information contained in the beacon. In the passive scanning method, scanning may be performed when the mobile station receives the AP's beacon. Since the mobile station must wait for the beacon, the passive scanning method has latency greater than the active scanning method.

FIG. 1 illustrates an example of a typical active scanning method according to IEEE 802.11 standards. A mobile station 100 broadcasts a Probe Request frame on a channel n−1 and waits for a Probe Response frame from an AP 150 for MinChannelTime. If no available AP 150 exists on the channel n−1, the mobile station 100, having waited for the MinChannelTime, determines that the AP 150 does not exist on a corresponding channel n−1, switches channels during ChannelSwitchingTime, and broadcasts a Probe Request on the channel n. $AP_K$ and $AP_{K+1}$ operate on the channel n and transmit a Probe Response to the mobile station 100 in response to the broadcast. The mobile station 100 receives the Probe Request from $AP_K$ within MinChannelTime. If the channel n is busy, the mobile station 100 extends a wait time for the Probe Response up to MaxChannelTime. After searching for the AP 150 on the channel n, the mobile station 100 switches a channel during ChannelSwitchingTime and searches for the AP 150 on a channel n+1.

According to the scanning method of IEEE 802.11 WLANs illustrated in FIG. 1, a scanning failure occurs when the mobile station 100 does not receive even a single Probe Response from the AP 150 despite scanning all channels. A shorter MaxChannelTime increases the probability of a scanning failure. Similarly, a longer MaxChannelTime decreases the scanning failure probability, but increases an overall scanning latency. This creates a trade-off between scanning failures and scanning latency. Many studies have been made on an optimal solution between the scanning failure and the scanning latency, but these studies only suggest a value of MaxChannelTime/MinChannelTime. One such example is discussed in "Techniques to reduce the IEEE 802.11b handoff time" in proceedings IEEE ICC '04, June 2004. A technology which can reduce both scanning failure and scanning latency has not been suggested until now.

SUMMARY OF THE INVENTION

Aspects of present invention enable a mobile station to perform fast scanning during a handoff procedure between APs.

Aspects of the present invention can reduce a scanning latency by searching an AP on an available channel and acquiring AP information while a mobile station performs scanning in a wireless communication system.

Aspects of the present invention can be applicable to an application sensitive to a latency, such as a Voice over WLAN (VoWLAN), by reducing a scanning latency during a handoff procedure of a mobile station.

Aspects of the present invention provide a seamless wireless communication system by providing an algorithm of detecting an optimal AP from a plurality of available APs when a mobile station performs scanning during a handoff procedure.

Aspects of the present invention provide a network interface to embody a 2-phase AP scanning algorithm.

According to an aspect of the present invention, there is provided a method of scanning an AP during a handoff procedure of a mobile station in a wireless communication system, the method comprising: transmitting query data to at least one AP on a predetermined channel; receiving response data about the query data from the AP on the predetermined channel; requesting AP information from the AP on the predetermined channel; and receiving the AP information from the AP.

According to another aspect of the present invention, there is provided a network interface included in an AP of a wireless communication system, the network interface comprising: a MAC driver to record a shared virtual MAC address and a unique MAC address assigned to the AP; a Physical Layer (PHY) controller to interface with a transmission media according to the wireless communication system; and a scanning component to communicate with a mobile station, via the PHY controller, using the shared virtual MAC address recorded in the MAC driver and to scan APs during a handoff procedure.

According to still another aspect of the present invention, there is provided a wireless communication system comprising: at least one AP assigned with a unique MAC address and a shared virtual MAC address; and at least one mobile station to search for the at least one AP, to receive AP information from the retrieved AP, and to perform a handoff, wherein the mobile station transmits query data to the shared virtual MAC address, receives response data from the AP, determines whether the AP exists on a predetermined channel, and when the AP exists on the channel, requests AP information from the AP having the shared virtual MAC address, and receives the AP information from the AP.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
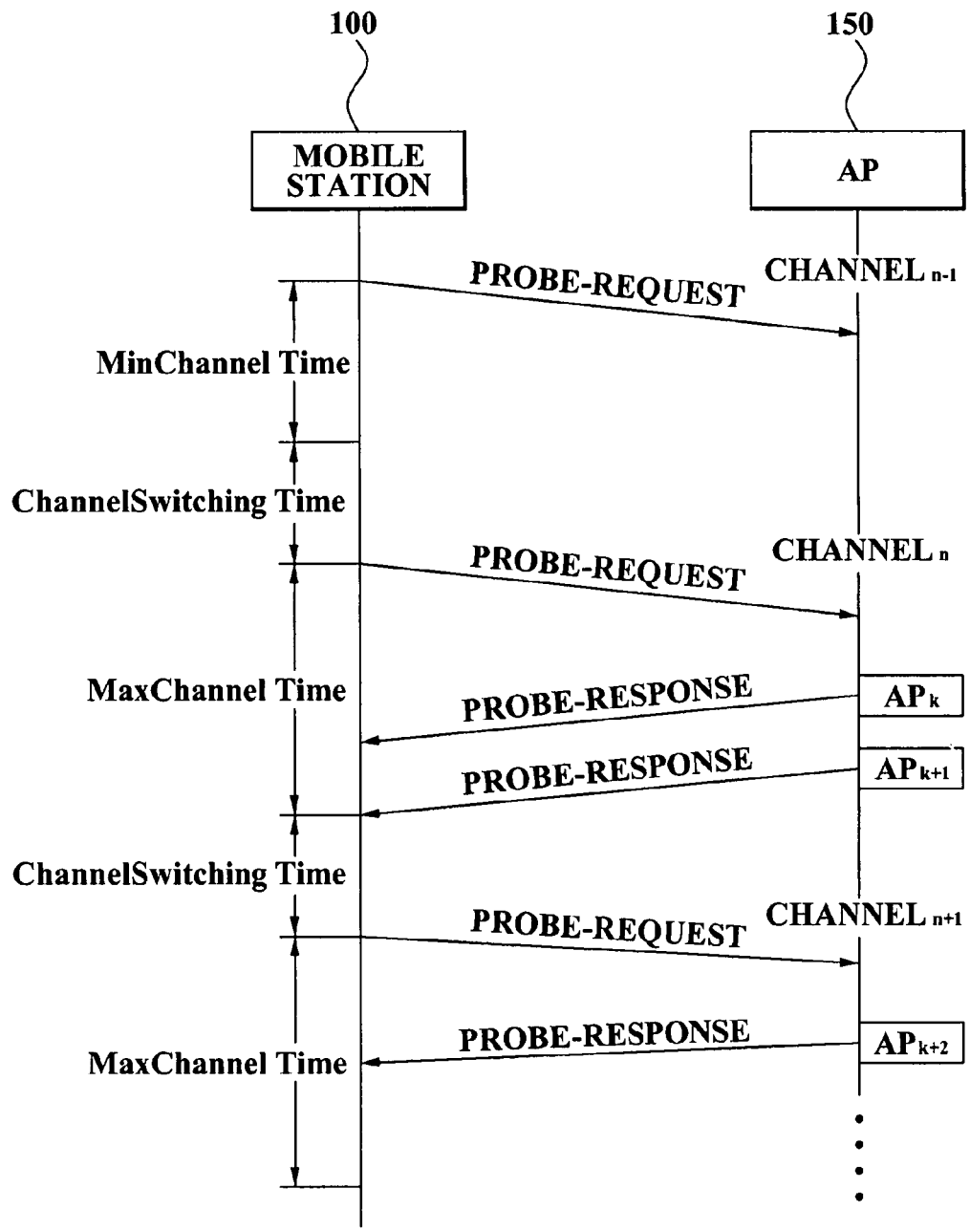
FIG. 1 is a diagram illustrating a conventional AP scanning method according to IEEE 802.11 WLANs.

Reference will now be made in detail to present embodiments of the present invention, examples of which are illustrated in the accompanying drawings, wherein like reference numerals refer to the like elements throughout. The embodiments are described below in order to explain the present invention by referring to the figures.

The descriptions will be only exemplary and thus, the present invention is not limited thereto. In addition, the term "handoff" referred to throughout the present specification should be understood as the same as the term "handover".

Overview

Figure 2:
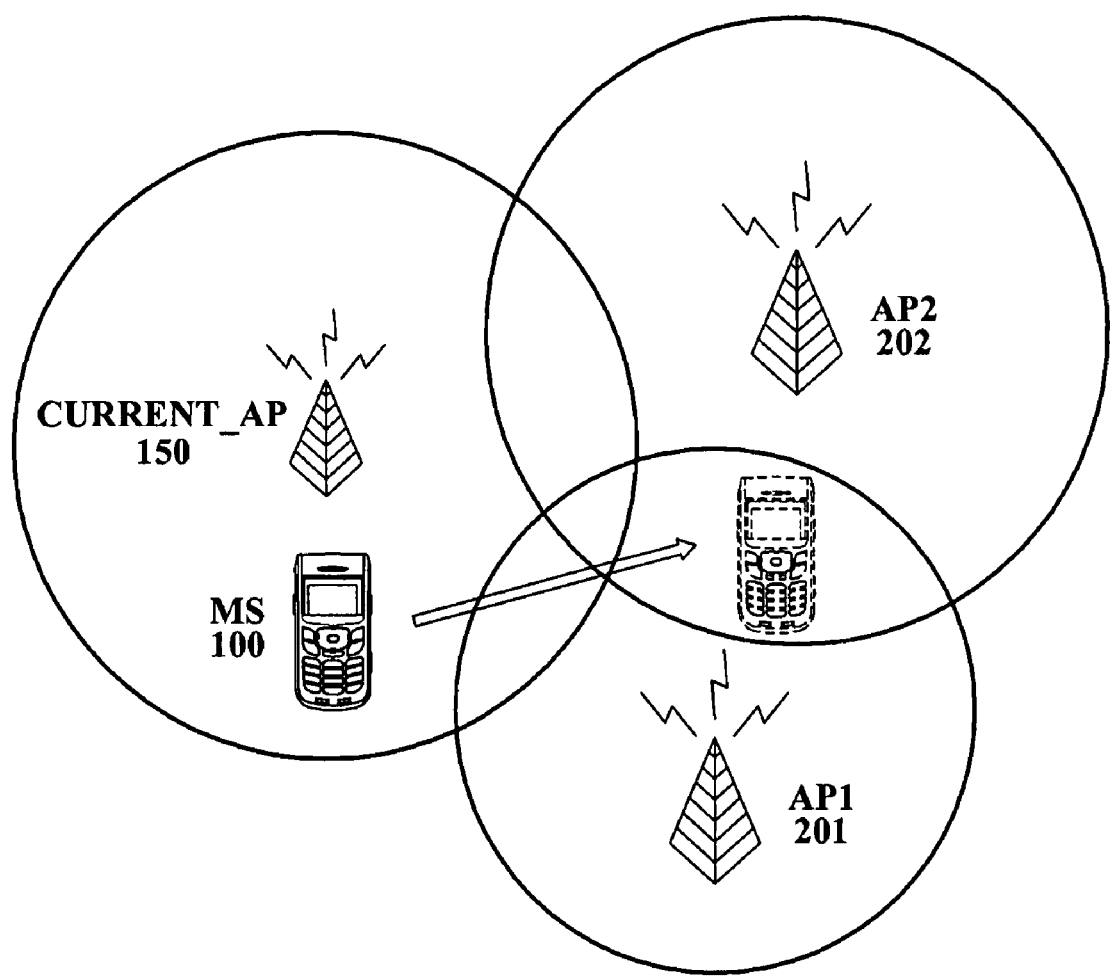
FIG. 2 is a diagram illustrating an example of a wireless communication system using a 2-phase scanning method according to an embodiment of the present invention.

FIG. 2 illustrates an example of a wireless communication system using a 2-phase scanning method according to an embodiment of the present invention. The wireless communication system employing the scanning method according to the present embodiment includes a current access point (current_AP) 150, an AP1 201 and an AP2 202 near the current_AP 150, and a mobile station 100. The mobile station 100 is currently communicating via current_AP 150. While the mobile station 100 operates in the wireless communication system, the mobile station 100 may, for example, move from the service coverage of the current_AP 150 to the neighboring AP1 201 and AP2 202. When this occurs, a handoff procedure including a scanning process according to aspects of the present invention is performed. Before the handoff procedure a scanning process is performed according to a 2-phase technique.

(1) AP Detection Phase

In the AP detection phase according to aspects of the present invention, the mobile station 100 searches for the AP1 201 and the AP2 202 without using the Probe Request/Probe Response frame exchange illustrated in the handoff scanning method of FIG. 1. Instead, the mobile station 100 transmits query data to a predetermined channel. The AP1 201 and the AP2 202 existing on the predetermined channel transmit response data about the query data to the mobile station 100. Thus, the mobile station 100 may detect the AP1 201 and the AP2 202 existing on the predetermined channel. The method of detecting the AP1 201 and the AP2 202 using the query data and the response data will be described in detail below.

To detect the neighboring AP1 201 and AP2 202 without using the Probe Request/Probe Response frame exchange used in the handoff scanning method of IEEE 802.11 standards illustrated in FIG. 1, a Request-to-Send (RTS) control frame and a Clear-to-Send (CTS) control frame may be used for a query message or a response message. The RTS control frame and the CTS control frame are defined in the IEEE 802.11 standards. According to the IEEE 802.11 standards, the mobile station 100 should receive the CTS control frame from an AP within Point coordination function InterFrame Space (PIFS) after transmitting the RTS control frame. However, if the mobile station 100 did not receive the CTS control frame from the AP within the PIFS (Short InterFrame Space (SIFS) period plus slot time), it implies that no AP exists on the corresponding channel to respond to the RTS control frame. Thus, the mobile station 100 may determine whether the AP exists on the channel by exchanging the RTS control frame and the CTS control frame.

Destination address information, i.e., address information of the neighboring AP1 201 and AP2 202, should be known in order to transmit the RTS control frame. Thus, according to the conventional AP scanning method, when the mobile station 100 does not have any AP information about the AP1 201 and the AP2 202, the mobile station 100 may not utilize an RTS/CTS control frame scheme.

To overcome the above disadvantages, aspects of the present invention suggest a new concept of a shared virtual Media Access Control (MAC) address. Specifically, if the mobile station 100 does not have AP information about the neighboring AP1 201 and AP2 202, the mobile station 100 may exchange an RTS/CTS control frame with the AP1 201 and the AP2 202 by recording the shared virtual MAC address in a Network Interface Card (NIC) of the AP1 201 and the AP2 202.

The mobile station 100 transmits the RTS control frame using the shared virtual MAC address, shared on a predetermined channel, as destination address information. The neighboring AP1 201 and AP2 202 operating on the channel receive the RTS control frame and transmit the CTS control frame corresponding to the RTS control frame to the mobile station 100. When the mobile station 100 receives the CTS control frame, the mobile station 100 may detect the AP1 201 and the AP2 202 operating on the channel.

(2) AP Information Acquisition Phase of AP

The mobile station 100 detects the neighboring AP1 201 and AP2 202 existing on a predetermined channel through the above-described AP detection phase. After detection, the mobile station 100 operates in an AP information acquisition phase with respect to the AP1 201 and the AP2 202.

The AP information acquisition phase is a procedure to acquire AP information from the AP1 201 and the AP2 202. Specifically, the mobile station 100 may acquire AP information such as a unique MAC address, (i.e., Basic Service Set IDentify, or BSSID), beacon interval, supported data rates, and the like. The AP information acquisition phase according to aspects of the present invention depends upon request-response. An example of request-response may include a Probe Request/Probe Response exchange method utilized in the handoff scanning method according to the IEEE 802.11 standards.

The mobile station 100 unicasts a Probe Request frame to the shared virtual MAC address of the channel where the AP1 201 and the AP2 202 are detected. The AP1 201 and the AP2 202 receive the Probe Request frame and transmit a Probe Response frame including AP information of the AP1 201 and the AP2 202 to the mobile station 100. According to an embodiment of the present invention, MaxChannelTime may be set to a large value to wait a longer time for the Probe Response frame from the AP1 201 and the AP2 202 after the mobile station 100 transmits the Probe Request frame. Unlike the conventional Probe Request/response frame exchange illustrated in FIG. 1, it can be known that the AP1 201 and the AP2 202 are in the corresponding channel. Thus, scanning failures may be decreased by increasing the MaxChannelTime. Also, a possible scanning latency risk may be reduced by not detecting the AP1 201 and the AP2 202 when the MaxChannelTime is increased. Even when a first MaxChannelTime elapses and the process times out, the mobile station 100 may establish a second MaxChannelTime and continue waiting for the Probe Response frame from the AP1 201.

Through the above-described 2-phase operations according to aspects of the present invention, the mobile station 100 may detect the AP1 201 and the AP2 202 and may acquire AP information of the AP1 201 and the AP2 202.

A detailed configuration of the AP detection phase and a detailed algorithm that can be employed in an AP discovery phase according to aspects of the present invention will be described with reference to FIGS. 3 through 6.

Detailed Description of AP Detection Phase

Figure 3:
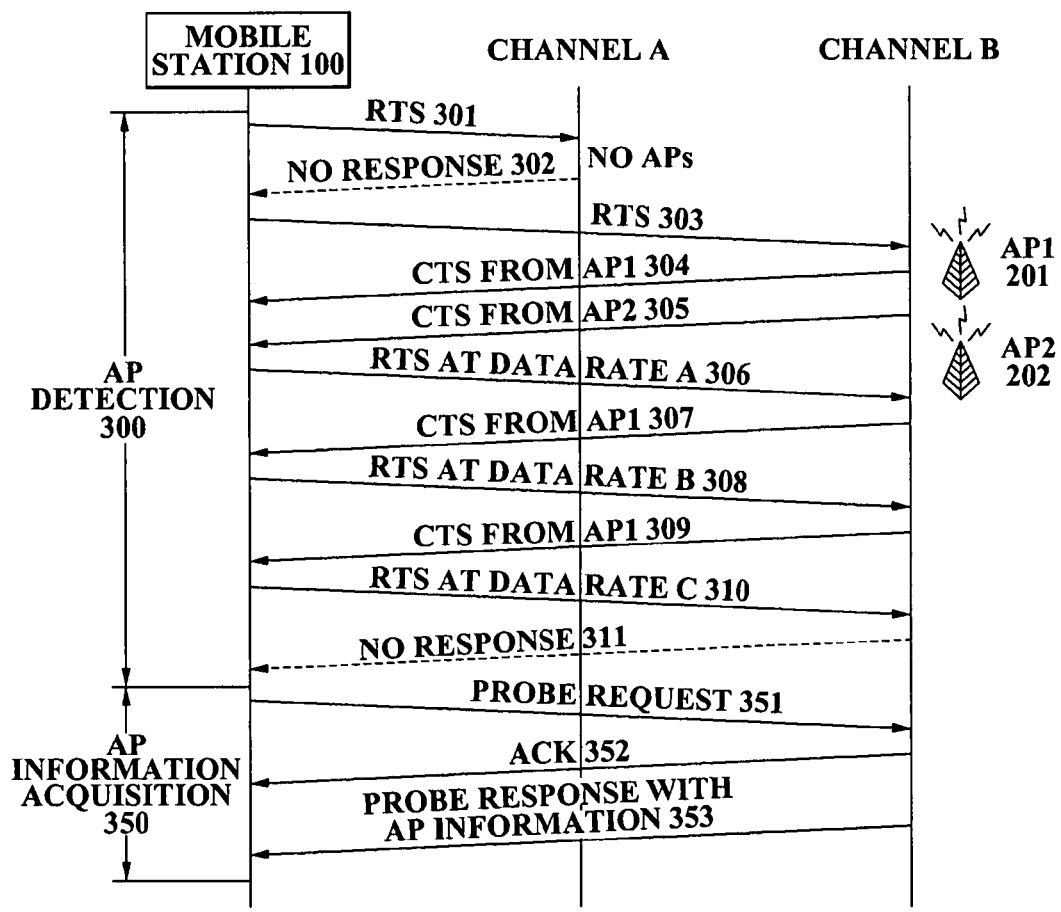
FIG. 3 is a diagram illustrating an example of a 2-phase scanning method according to an embodiment of the present invention.

FIG. 3 illustrates an example of a 2-phase scanning method according to an embodiment of the present invention. Scanning for an access point by the 2-phase scanning method is shown. The mobile station 100 detects an AP1 201 and an AP2 202 during an AP detection phase 300 and acquires AP information during an AP information acquisition phase 350.

In operation 301 of the AP detection phase 300, the mobile station 100 transmits an RTS control frame to a shared virtual MAC address on a channel A. Since no AP exists on the channel A, there is no response to the transmitted RTS control frame in operation 302. In operation 303, the mobile station switches from the channel A to a channel B and transmits the RTS control frame to the shared virtual MAC address on the channel A. In operations 304 and 305, the AP1 201 and the AP2 202 transmit a CTS control frame to the mobile station 100 after receiving the RTS control frame.

According to an embodiment of the present invention, the mobile station 100 may utilize the following method to ascertain the maximum achievable data rates provided by the AP1 201 and the AP2 202 existing on the channel B. In operation 306, the mobile station 100 transmits the RTS control frame to the channel B, which received the CTS control frame, at a basic data rate A. In operation 307, the AP1 201 receives the transmitted RTS control frame and transmits the CTS control frame to the mobile station 100. In operation 308, the mobile station 100 receives the CTS control frame and transmits the RTS control frame at a data rate B, which is at a higher data rate than the data rate of data rate A. In operation 309, the AP1 201 transmits the CTS control frame in response to the RTS control frame transmitted at the data rate B. In operation 310, the mobile station 100 re-transmits the RTS control frame at a data rate C, which is at a higher data rate than the data rate of data rate B. In operation 311, the AP1 201 does not transmit the CTS control frame in response to the transmitted RTS control frame, and thus the mobile station 100 may determine that the data rate B is the maximum achievable data rate for data communication with the AP1 201 on the channel B. A higher data rate generally reduces service coverage. Thus, the maximum achievable data rate between the mobile station 100 and the AP1 201 may be determined while exchanging the RTS/CTS control frame through operations 306 to 311.

According to an embodiment of the present invention, the wireless communication system may be a wireless local area network (WLAN) according to IEEE 802.11 standards, and the data rate may be any one selected from 6 Mbps, 9 Mbps, 12 Mbps, 18 Mbps, 24 Mbps, 36 Mbps, 48 Mbps, and 54 Mbps. Other aspects of the present invention may use other data rates.

The mobile station 100 may determine that the AP1 201 and the AP2 202 exist on the channel B by performing the RTS/CTS control frame exchange through operations 301 to 310. The maximum achievable data rate of each of the AP1 201 and the AP2 202 may be determined as well. In FIG. 3, the maximum achievable data rate of the AP1 201 is a data rate higher than the maximum achievable data rate of AP2 202.

In operation 351 of the AP information acquisition 350, the mobile station 100 transmits a Probe Request frame 351 by using the shared virtual MAC address as a destination address. In operations 352 and 353, the AP1 201 and the AP2 202 transmit an acknowledgement (ACK) after receiving the Probe Request frame, and transmits a Probe Response including AP information of the AP1 201 and the AP2 202 to the mobile station 100.

Figure 4:
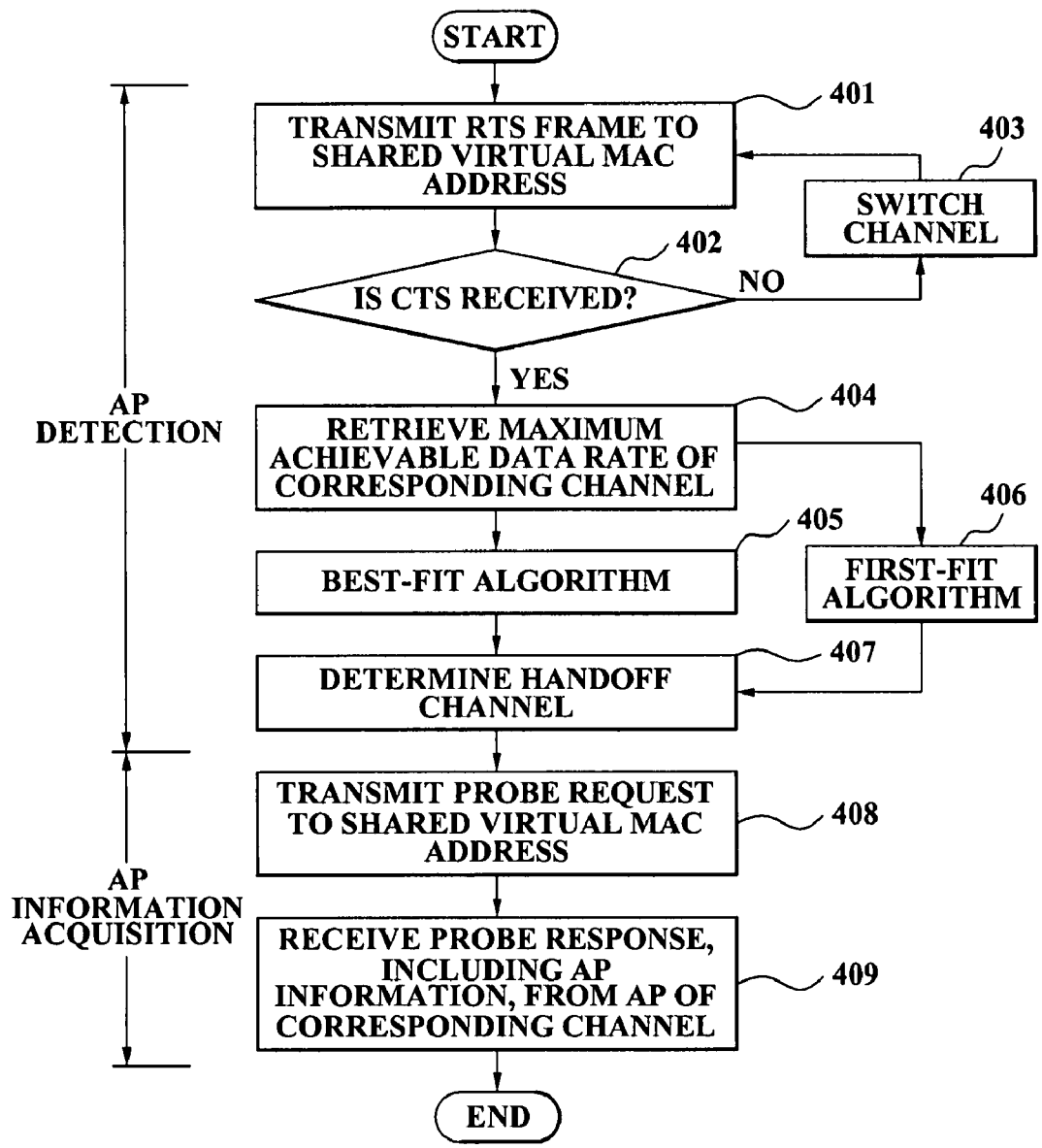
FIG. 4 is a flowchart illustrating a 2-phase scanning method which is performed in a mobile station according to an embodiment of the present invention.

FIG. 4 is a flowchart illustrating a 2-phase scanning method performed in a mobile station according to an embodiment of the present invention. An algorithm for the AP scanning method according to aspects of the present invention will be described in detail. In operation 401, the mobile station 100 transmits an RTS control frame to a shared virtual MAC address via a predetermined channel. In operation 402, it is determined whether a CTS control frame is received from the AP1 201 and the AP2 202 within a PIFS. If the CTS control frame is not received, then in operation 403 the AP scanning method switches channels and returns to operation 401. If the CTS control frame is received, a maximum achievable data rate at a corresponding channel is determined in operation 404, which has been described with reference to FIG. 3. Two algorithms may be utilized to determine an optimal channel to handoff to using the results of the maximum achievable data rate in operation 404. The two algorithms include a best fit algorithm (operation 405) and a first-fit algorithm (operation 406).

(1) Best-Fit Algorithm (Operation 405)

Figure 5:
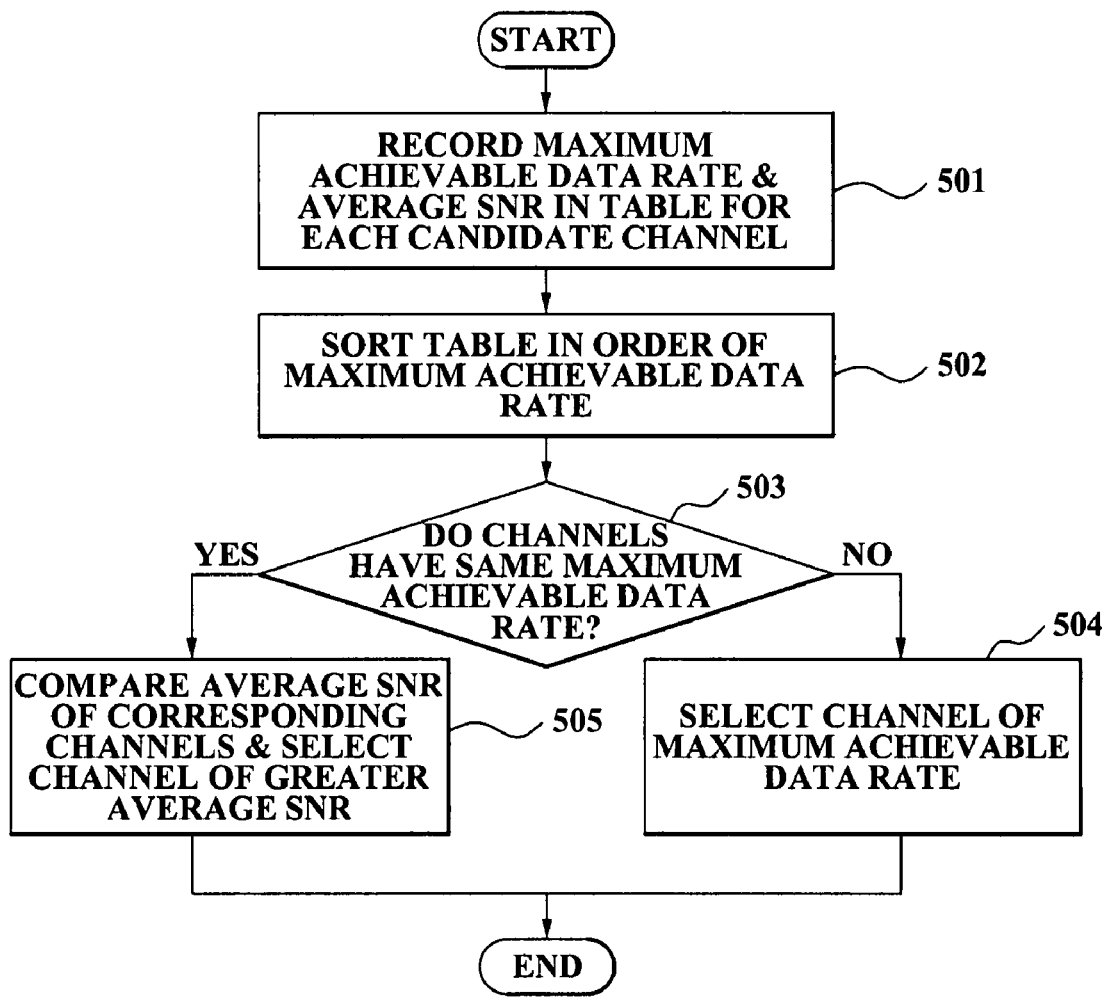
FIG. 5 is a flowchart illustrating a best-fit algorithm included in the 2-phase scanning method illustrated in FIG. 4.

FIG. 5 is a flowchart illustrating a best-fit algorithm included in the 2-phase scanning method illustrated in FIG. 4. The mobile station 100 performs an AP detection phase operation with respect to at least one candidate channel. In operation 501, the mobile station 100 measures a maximum achievable data rate of the at least one candidate channel and records an average signal-to-ratio (SNR) of a corresponding channel in a predetermined table. The average SNR may be measured based on the CTS control frame received from the AP of the corresponding channel. A group of the maximum achievable data rates and the average SNRs, which are recorded in a table for each channel, is designated as a RateSet. In operation 502, the RateSets in the table are sorted in descending order of the maximum achievable data rate. In operation 503, the mobile station 100 selects a channel located at the top of the table, i.e., a channel of the greatest maximum achievable data rate, as a channel to handoff to. When channels have the same maximum achievable data rate within a corresponding RateSet in operation 504, the average SNR of the corresponding channels are compared and the channel having the largest average SNR is selected as the channel to handoff to in operation 505.

When using a best-fit algorithm, MaxChannelTime of the AP information acquisition operation may be set to a greater value, since the probability that an AP exists on a corresponding channel is very high. The mobile station 100 waits for the Probe Request frame to be transmitted from the AP for the predetermined MaxChannelTime. However, if the mobile station 100 does not receive the Probe Request frame within the corresponding MaxChannelTime, the mobile station 100 may wait to receive the Probe Request frame for an additional period of time. When only a single Probe Response frame is transmitted, and when the corresponding frame satisfies only an SNR required for handoff, the handoff procedure may start immediately.

(2) First-Fit Algorithm (Operation 406)

Figure 6:
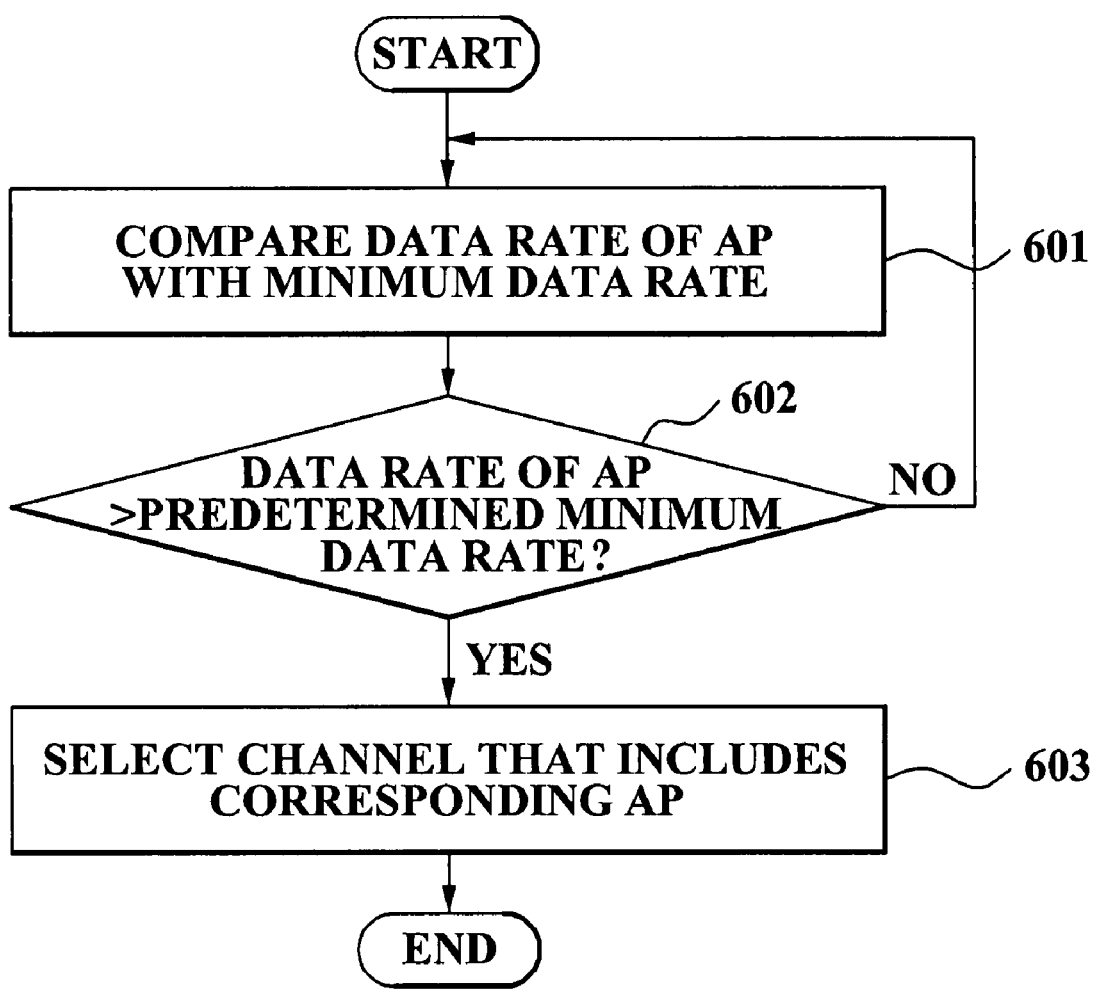
FIG. 6 is a flowchart illustrating a first-fit algorithm included in the 2-phase scanning method illustrated in FIG. 4.

FIG. 6 is a flowchart illustrating a first-fit algorithm included in the 2-phase scanning method illustrated in FIG. 4. The mobile station 100 performs an AP detection phase operation with respect to at least one candidate channel. In operation 601, a technique for measuring the maximum achievable data rate of a corresponding channel through the RTS/CTS control frame exchange in operation 404 of FIG. 4 is utilized. A predetermined data rate is compared with a data rate that is measured in real time at the corresponding channel. The data rate may be the data rate when transmitting an RTS control frame and receiving a CTS control frame corresponding thereto while increasing the data rate. The predetermined data rate is a factor that a system designer can determine. If the predetermined data rate is set to a greater value, it will take a relatively long time to select a channel based on the first-fit algorithm, but a relatively high data rate may be secured. If the predetermined data rate is set to a relatively low value, the opposite situation will occur. When the data rate of the AP of the corresponding channel is determined to be greater than the predetermined minimum data rate in operation 602, a channel including the corresponding AP is selected in operation 603. The CTS control frame is received from the AP and the Probe Request frame is transmitted to the shared virtual MAC address after an SIFS time.

Referring to FIG. 4, the channel to be handed-off can be determined in operation 407 using the best-fit algorithm (operation 405) or the first-fit algorithm (operation 406). Then, the mobile station 100 transmits a Probe Request to the shared virtual MAC (operation 408) and receives Probe Response, including AP information, from AP of the corresponding channel (operation 409.)

Application of Shared Virtual MAC Address

Figure 7:
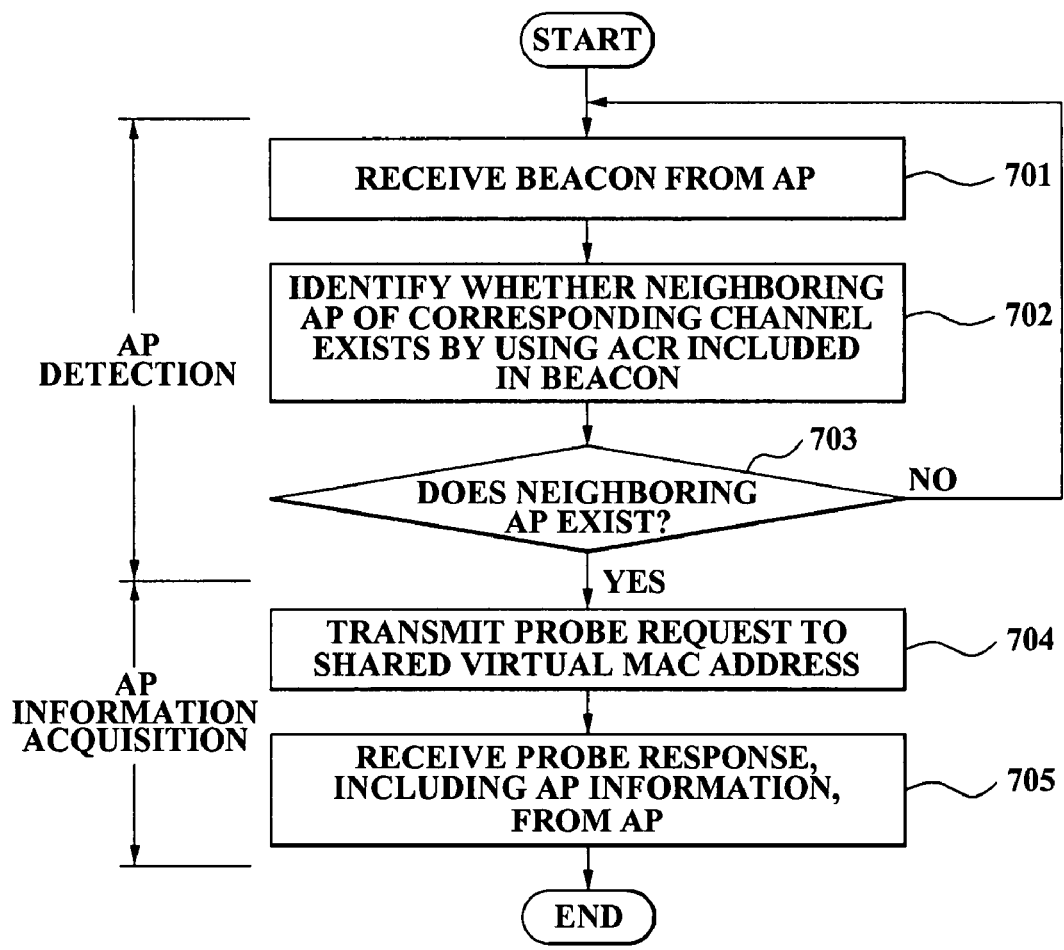
FIG. 7 is a flowchart illustrating an example of a scanning method applying a shared virtual MAC address to a passive scanning method according to an embodiment of the present invention.

FIG. 7 is a flowchart illustrating an example of a scanning technique applying a shared virtual MAC address, according to an exemplary embodiment of the present invention, to a passive scanning method. An application example of using the shared virtual MAC according to an aspect of the present invention will be described in detail with reference to FIG. 7.

In FIG. 7, a shared virtual MAC address scheme according to an embodiment of the present invention is applied to the passive scanning method of an AP scanning method. In operation 701, the mobile station 100 of FIG. 1 receives a periodic beacon from an AP. In operation 702, the mobile station 100 detects whether a neighboring AP exists on a corresponding channel using an AP channel report (ACR) contained in the beacon. In operation 703, it is determined whether the neighboring AP exists. If no neighboring AP exists on the channel, the mobile station 100 returns to operation 701 and receives the beacon from the AP. If the neighboring AP does exist on the channel, the mobile station 100 transmits a probe request frame to the shared virtual MAC address via the corresponding channel in operation 704. In operation 705, the probe response frame including AP information is received from the AP and the scanning procedure is terminated.

The application example illustrated in FIG. 7 also performs (1) AP detection and (2) AP information acquisition. The only difference depends upon whether AP detection is performed by an active method or a passive method. Also, in FIG. 7, as described above, the maximum achievable data rate may be measured through the exchanging of the RTS/CTS control frame while searching for the neighboring AP in operation 702. Algorithms such as the best-fit algorithm or the first-fit algorithm may be utilized.

The 2-phase scanning method during a handoff procedure according to the above-described exemplary embodiment of the present invention may be recorded in computer-readable media including program instructions to implement various operations embodied by a computer. The media may also include, alone or in combination with the program instructions, data files, data structures, and the like. Examples of computer-readable media include magnetic media, such as hard disks, floppy disks, and magnetic tape; optical media such as CD ROM disks and DVD; magneto-optical media, such as optical disks; and hardware devices specially configured to store and perform program instructions, such as read-only memory (ROM), random access memory (RAM), flash memory, and the like. A transmission medium may also be a employed, such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

Figure 8:
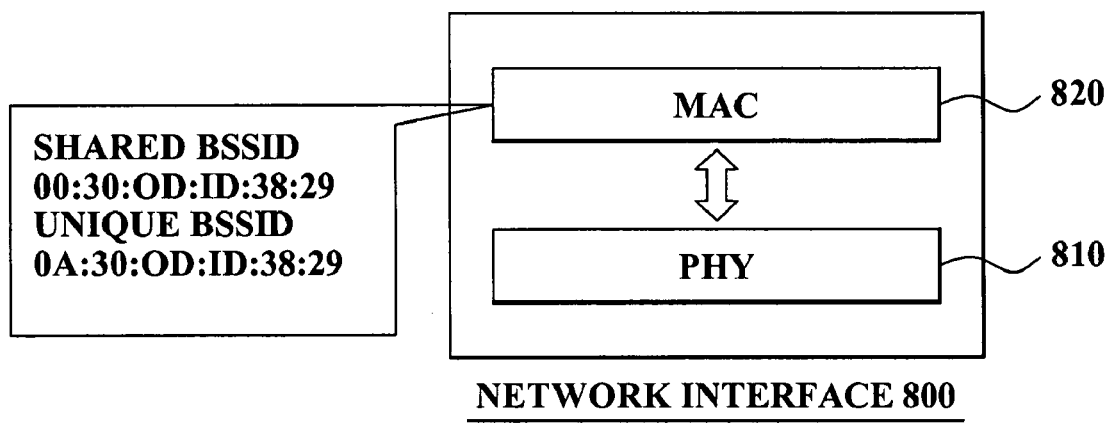
FIG. 8 is a block diagram illustrating a network interface according to an embodiment of the present invention.

The AP scanning method according to aspects of the present invention may be applied to various fields of endeavor. Depending upon circumstances, the AP scanning method according to aspects of the present invention may be embodied in a network interface to be included in an AP or a mobile station. FIG. 8 is a block diagram illustrating a network interface 800 according to an embodiment of the present invention.

The network interface 800 supporting the 2-phase scanning method may include a Physical Layer (PHY) controller 810 and a MAC driver 820. The PHY 810 controls a physical layer of a wireless communication network. The MAC driver 820 records a shared virtual MAC address and a unique MAC address assigned to the AP. A unique MAC address is assigned to each mobile station. The shared virtual MAC address recorded in the MAC driver 820 is utilized to communicate with a mobile station of the wireless communication system and to scan APs during a handoff procedure. The scanning method using the shared virtual MAC address has been described above in detail; further detailed description will be omitted.

The PHY controller 810 and the MAC driver 820 of the network interface 800 describe the 2-phase scanning method according to the present invention, described with FIGS. 2 through 7, as a functional module. Thus, when employing the AP scanning technique using the shared virtual MAC address according to aspects of the present invention, changing the name of the functional module, classification/merging of functions, and the like, still falls within the scope of the present invention.

The present invention has been described based on IEEE 802.11 standards, but the present invention may be applicable to a scanning method to support fast handoff in other wireless communication systems as well.

As described above, according to aspects of the present invention, a mobile station may perform fast scanning during a handoff procedure between APs.

Also, according to aspects of the present invention, it is possible to reduce a scanning latency by searching an AP on an available channel and acquiring AP information while a mobile station performs scanning in a wireless communication system.

Also, according to aspects of the present invention, it is possible to be applicable to an application sensitive to a latency, such as a Voice over WLAN (VoWLAN), by reducing a scanning latency during a handoff procedure of a mobile station.

Also, according to aspects of the present invention, it is possible to provide a seamless wireless communication system by providing an algorithm of detecting an optimal AP from a plurality of available APs when a mobile station performs scanning during a handoff procedure.

Also, according to aspects of the present invention, it is possible to provide a network interface to embody a 2-phase AP scanning algorithm.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of scanning an access point (AP) during a handoff procedure of a mobile station in a wireless communication system, the method comprising:
   transmitting, by the mobile station, a query message including query data on a predetermined channel to detect at least one neighboring AP using a shared virtual Media Access Control (MAC) address;
   receiving, by the mobile station, from the at least one neighboring AP, a response message generated by the at least one neighboring AP, the response message including response data in response to the query data;
   detecting, by the mobile station, the at least one neighboring AP based on the query message and response message;
   requesting, by the mobile station, AP information from the at least one neighboring AP that has transmitted the response message to the mobile station; and
   receiving, by the mobile station, the AP information from the at least one neighboring AP;
   wherein the AP information is information regarding the at least one neighboring AP.

2. The method according to claim 1, wherein the receiving of the response message comprises:
   switching from the predetermined channel to another channel to transmit the query message including the query data, when the response message was not received from the at least one neighboring AP via the predetermined channel.

3. The method according to claim 1, wherein the AP information comprises at least one of a MAC address of the at least one neighboring AP, a beacon interval, and a supported data rate.

4. The method according to claim 1, wherein the at least one neighboring AP has the shared virtual MAC address.

5. The method according to claim 4, wherein the shared virtual MAC address is known to the mobile station.

6. The method according to claim 4, wherein:
   the transmitting the query message comprises transmitting a Reset-to-Send (RTS) control frame from the mobile station to the shared virtual MAC address; and
   the receiving the response message comprises receiving a Clear-to-Send (CTS) control frame from the AP.

7. The method according to claim 4, further comprising:
   transmitting the query data via the predetermined channel and at least one other channel at a predetermined minimum data rate value;
   re-transmitting the query data by increasing the minimum data rate value, when the response data about the query data is received from the at least one neighboring AP;
   repeating the re-transmitting until the response data is not received from the at least one neighboring AP; and
   determining a data rate of a previous query data having a highest data rate from among all of the previous query data, to which response data was received from the AP, as a maximum achievable data rate with respect to a corresponding channel, when the response data is not received from the at least one neighboring AP.

8. The method according to claim 7, wherein the wireless communication system is a wireless local area network (WLAN) according to an Institute of Electrical and Electronics Engineers (IEEE) 802.11 standard, and, in the re-transmitting, the data rate is any one of 6 Mbps, 9 Mbps, 12 Mbps, 18 Mbps, 24 Mbps, 36 Mbps, 48 Mbps, and 54 Mbps.

9. The method according to claim 7, further comprising:
   recording an average signal-to-noise ratio (SNR) in a predetermined table, based on the maximum achievable data rate determined for each channel and the response data received via the predetermined channel,
wherein the at least one neighboring AP is determined according to predetermined criteria.

10. The method according to claim 9, wherein the predetermined criteria comprise:
having a maximum value from the maximum achievable data rate that is stored in the predetermined table; and
having the highest average SNR when the maximum achievable data rate is identical.

11. The method of claim 4, further comprising:
transmitting the query message to the channel and at least one other channel at a predetermined minimum data rate value;
re-transmitting the query message by increasing a minimum data rate value, when the response data about the query data is received from the at least one neighboring AP; and
repeating the re-transmitting until the response message including the response data is received, and requesting AP information from the at least one neighboring AP when the increased data rate is greater than a predetermined minimum rate.

12. The method of claim 4, wherein:
the requesting the AP information comprises transmitting a Probe Request to the shared virtual MAC address; and
the receiving the AP information comprises receiving a Probe Response from the at least one neighboring AP.

13. The method of claim 12, further comprising:
waiting to receive the Probe Response for a first MaxChannelTime by the mobile station after transmitting the Probe Request.

14. The method of claim 13, further comprising:
waiting to receive the Probe Response for a second MaxChannelTime by the mobile station, when the mobile station did not receive the Probe Response after the first MaxChannelTime has elapsed.

15. A wireless communication system comprising:
at least one access point (AP) assigned with a unique Media Access Control (MAC) address and a shared virtual MAC address; and
at least one mobile station to search for the at least one AP, receive AP information from the AP, and perform a handoff,
wherein the mobile station transmits a query message including query data to the shared virtual MAC address to detect the at least one AP, receives a response message including response data from the at least one AP detected by the transmitted query data, determines whether the at least one AP exists on a predetermined channel, and, when the at least one AP exists on the channel, requests AP information regarding the AP from the at least one AP having the shared virtual MAC address, and receives the AP information regarding the AP from the AP.

16. The wireless communication system of claim 15, wherein the wireless communication system corresponds to a wireless local area network WLAN according to IEEE 802.11 standards, the query data corresponds to an RTS control frame, the response data corresponds to a Clear-to-Send (CTS) frame, the mobile station requests AP information from the AP using a Probe Request frame, and the AP transmits the AP information to the mobile station using the Probe Response frame.

17. A non-transitory computer readable medium having computer-executable instructions to perform a method comprising:
transmitting, by a mobile station, a query message including query data on a predetermined channel to detect at least one neighboring AP using a shared virtual Media Access Control (MAC) address;
receiving, by the mobile station, from the neighboring AP, a response message generated by the neighboring AP including response data about the query data;
requesting, by the mobile station, AP information from the neighboring AP that transmitted the response message to the mobile station; and
receiving, by the mobile station, the AP information from the neighboring AP;
wherein the AP information is information regarding the neighboring AP.

18. A method of scanning an access point (AP) during a handoff procedure of a mobile station in a wireless communication system, the method comprising:
transmitting, by the mobile station, query data on a predetermined channel to detect at least one AP using a shared virtual Media Access Control (MAC) address;
receiving, by the mobile station, response data about the query data from the AP detected by the transmitted query data on the predetermined channel;
requesting, by the mobile station, AP information from the AP that has transmitted the response data to the mobile station; and
receiving, by the mobile station, the AP information from the AP, wherein the AP information is information regarding the AP;
transmitting the query data via the predetermined channel and at least one other channel at a predetermined minimum data rate value;
re-transmitting the query data by increasing the minimum data rate value, when the response data about the query data is received from the AP; and
repeating the re-transmitting until the response data is not received from the AP; and
determining a data rate of a previous query data having a highest data rate from among all of the previous query data, to which response data was received from the AP, as a maximum achievable data rate with respect to a corresponding channel, when the response data is not received from the AP.

* * * * *